United States Patent
Kameda (10) Patent No.: US 7,352,144 B2
(45) Date of Patent: Apr. 1, 2008

(54) MOTOR DRIVING DEVICE HAVING MOSFET, MOSFET, AND MOTOR HAVING MOSFET

(75) Inventor: Koji Kameda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 162 days.

(21) Appl. No.: 11/281,872

(22) Filed: Nov. 17, 2005

(65) Prior Publication Data

US 2006/0115242 A1 Jun. 1, 2006

(30) Foreign Application Priority Data

Nov. 19, 2004 (JP) .............................. 2004-335648

(51) Int. Cl.
*H02K 21/00* (2006.01)

(52) U.S. Cl. .................. 318/254; 318/138; 318/439; 388/800; 388/803

(58) Field of Classification Search ............... 388/803, 388/802, 804, 808; 315/291; 322/28; 361/91.1, 361/184; 318/254, 138, 439
See application file for complete search history.

(56) References Cited

U.S. PATENT DOCUMENTS

| 2003/0062877 A1* | 4/2003 | Watanabe et al. ............. 322/28 |
| 2004/0119425 A1* | 6/2004 | Okamoto et al. ........... 315/291 |

FOREIGN PATENT DOCUMENTS

| JP | 2000-164859 | 6/2000 |
| JP | 2003-174791 | 6/2003 |
| JP | 2003-333883 | 11/2003 |

* cited by examiner

*Primary Examiner*—Karen Masih
(74) *Attorney, Agent, or Firm*—RatnerPrestia (57) ABSTRACT

Each connection point of three series circuits formed by connecting two MOSFETs in series between positive and negative terminals of a direct-current power source is connected to a driving coil of a motor. The MOSFET is composed of an FET main body, and a parasitic element group, and its current tolerance is a sum of maximum value of a first current flowing in the FET main body when the MOSFET is turned on, and maximum value of a second current flowing in the parasitic element group upon transition of the MOSFET from on to off state.

22 Claims, 5 Drawing Sheets

MOTOR DRIVING DEVICE HAVING MOSFET, MOSFET, AND MOTOR HAVING MOSFET

FIELD OF THE INVENTION

The present invention relates to a motor driving device composing an inverter circuit by MOSFET, a MOSFET, and a motor having MOSFET. In particular, the MOSFET has enough current tolerance not inducing avalanche breakdown, latch-up breakdown, or short-circuit breakdown.

BACKGROUND OF THE INVENTION

Recently, a MOSFET is used widely as a switching element for output in an inverter circuit in a motor driving device. Motor load includes a large inductance component, and noise may be caused by counterelectromotive force of motor when changing phases, or switching element for output may be broken down due to circulating currents of regenerative energy when decelerating or stopping the motor. In particular, when MOSFET is used, since switching speed is fast and parasitic transistor is present owing to its structural characteristics, avalanche tolerance breakdown or latch-up tolerance breakdown may occur. It is attempted to prevent lead-through current from flowing by preventing the MOSFET of upper arm and MOSFET of lower arm of inverter circuit from being turned on simultaneously due to malfunction by noise.

Various measures are proposed for preventing breakdown of MOSFET used as switching element for output in inverter circuit. For example, Japanese Patent Application Laid-Open No. 2003-333883 discloses a method of inserting a pause period when changing phases of inverter circuit. In a certain time after turning off the switching element of the conductive phase, the next switching element is turned on, and the switching elements of both upper arm and lower arm are not turned on simultaneously, so that lead-through current will not flow.

Japanese Patent Application Laid-Open No. 2003-174791 discloses a technology of suppressing generation of noise due to counterelectromotive force of motor when changing phases of inverter circuit. The technology comprises a comparator for detecting counterelectromotive force having a larger voltage value than the supply voltage, and a comparator for detecting counterelectromotive force having a smaller voltage value than the grounding voltage, and when these counterelectromotive forces are detected, the switching element of the corresponding upper arm or lower arm is turned on, and noise is suppressed.

On the other hand, thanks to progress in semiconductor technology, in particular the MOSFET is much reduced in size, there is a trend of decreasing the chip area and decreasing the loss in turn-on time by lowering the on-state resistance from the viewpoint of cost, but at the same time the current density per unit area of element is raised. The structure is also changed from the conventional planar structure to trench structure. In this background, if a wrong element is selected, it easily leads to breakdown, and such risk is increasing.

The prior arts disclosed in these two patent publications are intended to prevent breakdown of MOSFET by adding a special circuit outside of inverter circuit forming the main body of motor driving circuit. As a result, the circuit is complicated, and the cost is increased.

SUMMARY OF THE INVENTION

It is hence an object of the invention to present a technology of preventing breakdown of MOSFET composing the inverter circuit without adding any special circuit.

The motor driving device of the invention comprises a plurality of series circuits formed by connecting two MOSFETs in series between positive and negative terminals of a direct-current power source, in which connection point of the two MOSFETs is connected to a driving coil of the motor, and this motor driving device is composed as follows. The MOSFET is composed of an FET main body, and a parasitic element group, and supposing a current flowing in the FET main body when the MOSFET is turned on to be a first current, and a current flowing in the parasitic element group upon transition of the MOSFET from on to off state to be a second current, the MOSFET is characterized by having a current tolerance in a sum of maximum value of the first current and maximum value of the second current. The parasitic element group is composed of a transistor connected in parallel to the FET main body, a zener diode connected between collector and base of the transistor, a capacitor connected in parallel to the zener diode, and a resistor connected between base and emitter of the transistor.

Specifically, the second current is a sum of a third current flowing in the capacitor, and a fourth current flowing in the zener diode. The third current is a product of a voltage change rate between source and drain of the MOSFET multiplied by a capacity of the capacitor. The capacity of the capacitor is a value when a voltage between drain and source of the MOSFET is 0 V.

More specifically, when the second current flows in the resistor, a voltage across the resistor is smaller than a threshold voltage between base and emitter of the transistor. This resistance value is smaller than a quotient of the threshold voltage between base and emitter of the transistor divided by maximum value of the first current.

In other preferred embodiment of the invention, the MOSFET has a short-circuit tolerance when short-circuited for a specified time in the direct-current power source, and this short-circuit tolerance is a quotient of a voltage of the direct-current power source divided by on-state resistance between drain and source of the MOSFET, and this specified time is a maximum time when the two MOSFETs composing the series circuit are turned on simultaneously.

The MOSFET of the invention has the configuration as described above. The motor of the invention includes a rotor, a driving coil for driving the rotor, and a MOSFET for controlling the driving coil, and the MOSFET has the same configuration as described above.

The invention can prevent breakdown of MOSFET without adding any special circuit to outside of the inverter circuit forming the main body of the motor driving device. Therefore, the motor driving circuit not increased in cost by complicated circuit can be presented.

DETAILED DESCRIPTION OF THE PREFERRED EMBODIMENTS

Preferred Embodiment 1

Figure 1:
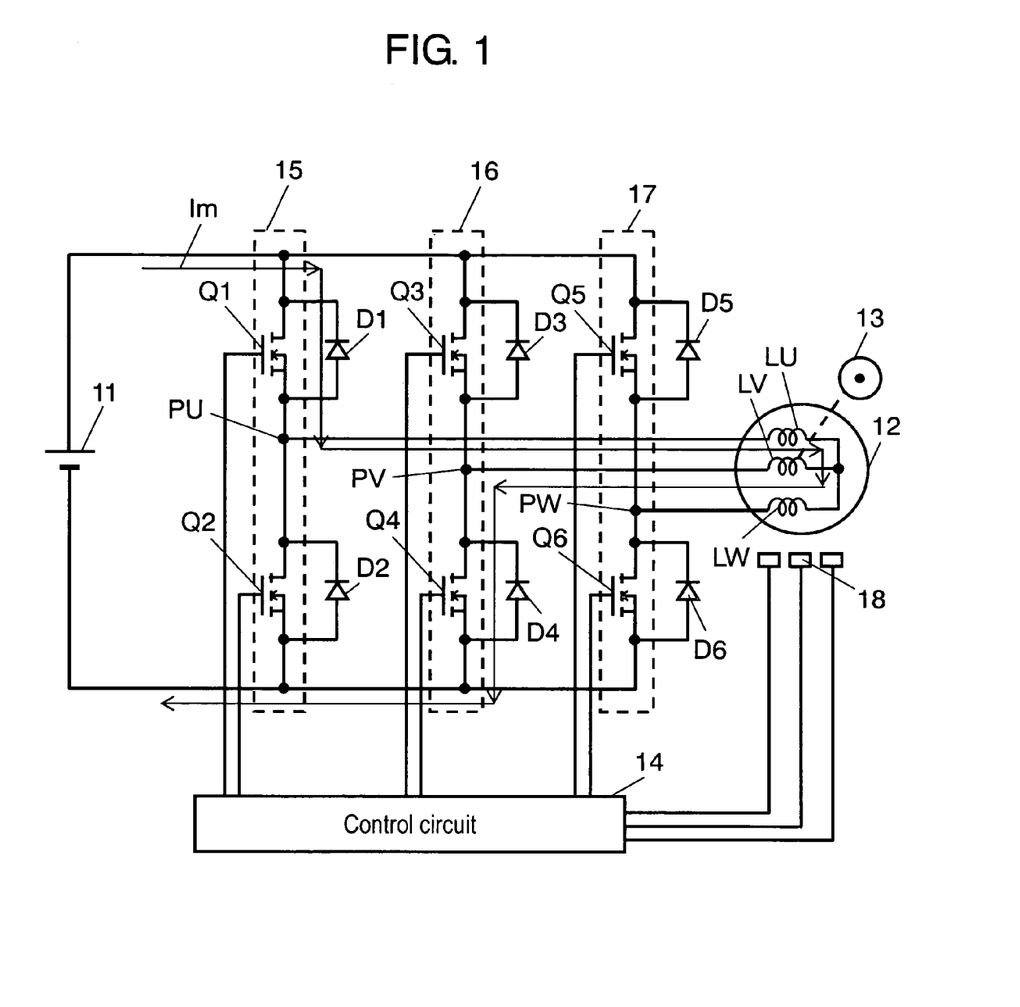
FIG. 1 is an overall circuit diagram of motor driving circuit in preferred embodiment 1 of the invention.

Preferred embodiment 1 of motor driving device of the invention is described below while referring to the accompanying drawings. FIG. 1 is an overall circuit diagram of motor driving circuit in preferred embodiment 1 of the invention.

In FIG. 1, a series circuit 15 of two MOSFETs Q1, Q2 is connected between positive and negative terminals of a direct-current power source 11. Similarly, a series circuit 16 of two MOSFETs Q3, Q4, and a series circuit 17 of two MOSFETs Q5, Q6 are connected between positive and negative terminals of the direct-current power source 11, respectively. Between source and drain of these six MOSFETs, flywheel diodes D1, D2, D3, D4, D5, D6 are connected individually. A three-phase inverter circuit is composed of these six MOSFETs and six flywheel diodes. As six flywheel diodes, parasitic elements of MOSFETs may be used.

Connection point PU of MOSFETs Q1 and Q2 is connected to U phase driving coil LU of motor, connection point PV of MOSFETs Q3 and Q4 is connected to V phase driving coil LV of motor, and connection point PW of MOSFETs Q5 and Q6 is connected to W phase driving coil LW of motor.

The motor is a so-called brushless DC motor, including a stator coil 12 having driving coils LU, LV, LW by star connection, and a rotor 13 having a permanent magnet. Three position sensors 18 are provided for detecting the position of magnetic poles of the rotor 13. Outputs from the position sensors 18 are connected to a control circuit 14. The control circuit 14 has a function of generating a commutation signal on the basis of position signals from the position sensors 18, and is connected to gates of six MOSFETs.

In the preferred embodiment having such configuration, the operation is described below. The control circuit 14 generates a commutation signal on the basis of position signals from the position sensors 18, and drives the motor by turning on and off the six MOSFETs sequentially on the basis of the commutation signal. In the driving coils LU, LV, LW, the motor current commutes from LU to LV, from LU to LW, from LV to LW, from LV to LU, from LW to LU, and from LW to LV, sequentially at an electrical angle of 60 degrees each, and the rotor 13 is rotated in specified direction. This driving system is known, and called three-phase 120-degree feeding system.

Supposing the MOSFETs Q1 and Q4 are on, while all other MOSFETs are off, motor current Im flows as shown in the drawing, and is supplied to the LV through the driving coil LU. At next moment, when the MOSFET Q4 is turned off, the motor current Im circulates through the flywheel diode D3. Further, when the MOSFET Q6 is turned on, the motor current Im commutes to the LW through the driving coil LU. Thus, the six MOSFETs are sequentially turned on and off repeatedly, and the motor is rotated in specified direction.

This operation is explained in general three-phase 120-degree feeding system, and the operation is same in PWM driving and sinusoidal driving.

Figure 2:
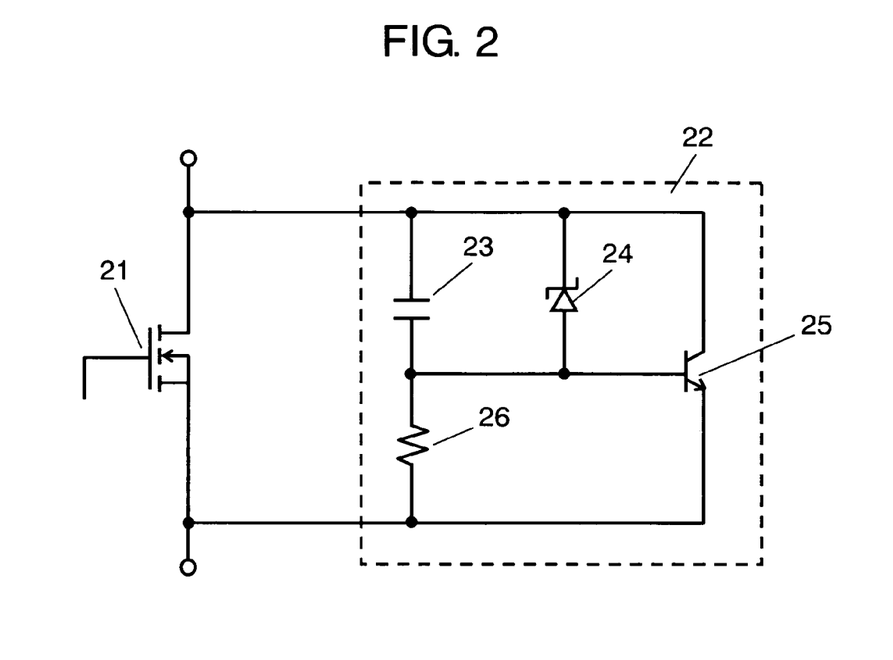
FIG. 2 is an equivalent circuit diagram of MOSFET of the same.

An equivalent circuit of MOSFETs Q1 to Q6 is shown in FIG. 2. The MOSFETs can be classified into an FET main body 21 having the intrinsic function, and a parasitic element group 22 formed parasitically in structure. The parasitic element group 22 includes a transistor 25 connected in parallel to the FET main body 21, a zener diode 24 connected between collector and base of this transistor 25, a capacitor 23 connected in parallel to this zener diode 24, and a resistor 26 connected between base and emitter of the transistor 25.

Figure 3:
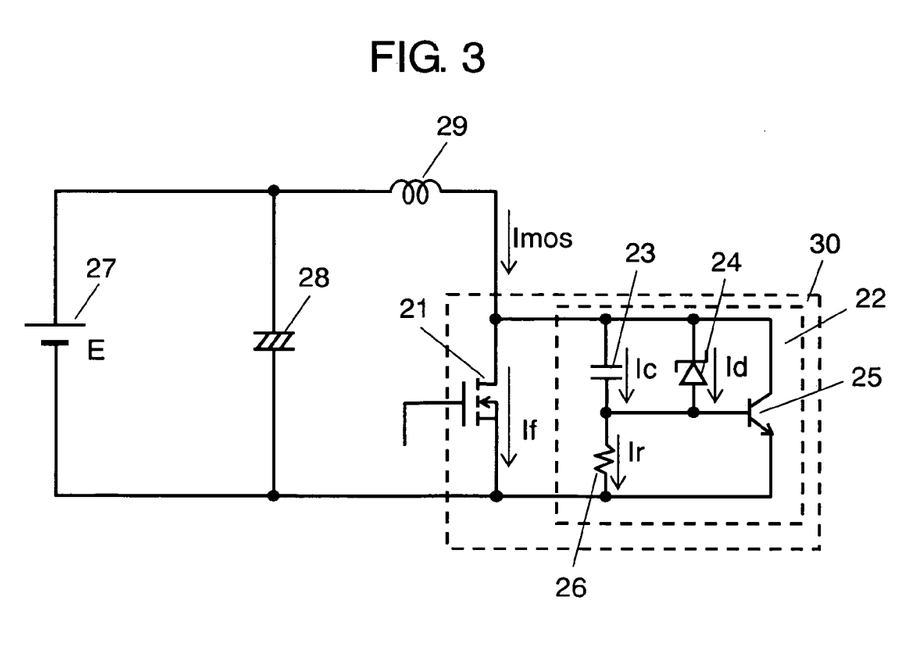
FIG. 3 is a current tolerance measuring circuit diagram of MOSFET of the same.

FIG. 3 shows a current tolerance measuring circuit of MOSFET 30. This MOSFET for measurement 30 corresponds to Q1 to Q6 in FIG. 1, and is shown in an equivalent circuit by dividing into FET main body 21 and parasitic element group 22 explained in FIG. 2. A capacitor 28 of large capacity is connected in parallel to the direct-current power source 27, and the power source impedance is lowered. Power is supplied to the MOSFET for measurement 30 from the direct-current power source 27 through an inductance load 29.

In a practical motor driving device shown in FIG. 1, the flywheel diodes D1 to D6 are connected to the MOSFETs, as parasitic elements formed in the MOSFETs, or connected externally. As a result, continuity of motor current is assured through the flywheel diode connected to the MOSFET forming a pair with the MOSFET that is turned off. Voltage Vd between drain and source of the MOSFET that is turned off, ideally, does not elevate more than the sum of supply voltage E and forward voltage of flywheel diode, but actually jumps momentarily due to effects of response of flywheel diode or impedance of wiring. In the current tolerance measuring circuit explained herein, this flywheel diode is not connected. Therefore, even after the MOSFET is turned off, the drain current continues to flow in order to assure continuity of current of inductance load, and hence limit of breakdown will be measured easily.

Figure 4A:
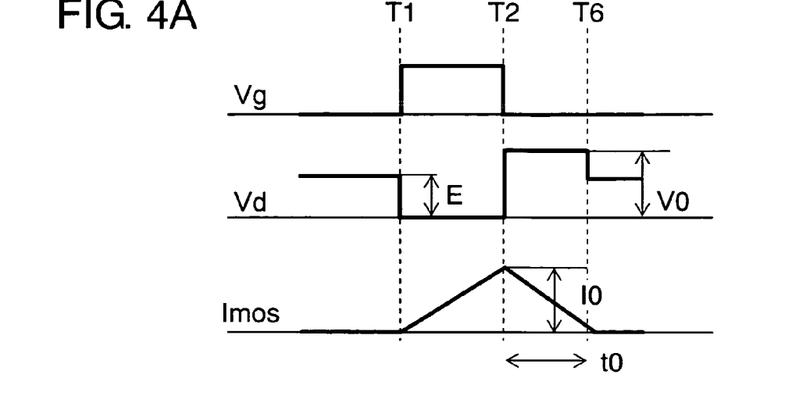
FIG. 4A, FIG. 4B, and FIG. 4C are waveform diagrams showing breakdown mode of MOSFET of the same.
Figure 4B:
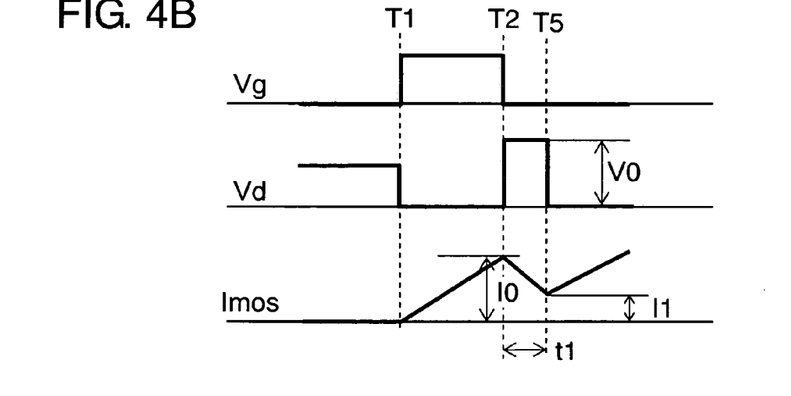
Figure 4C:
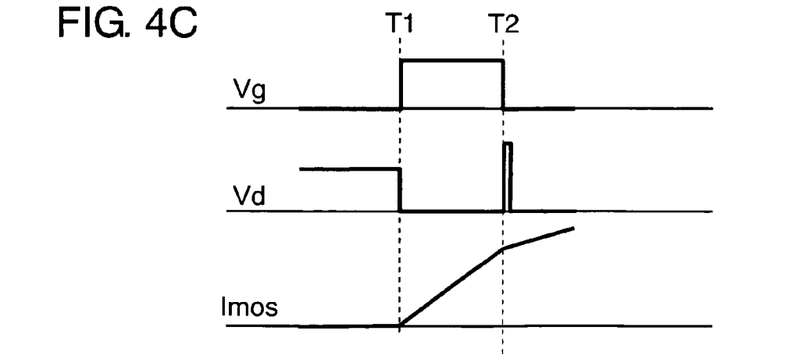

FIG. 4A, FIG. 4B, and FIG. 4C conceptually show voltage Vg between gate and source, voltage Vd between drain and source, and drain current Imos of the MOSFET for measurement. Breakdown mode and breakdown limit of MOSFET for measurement are explained. For the ease of explanation, the following two points are assumed. That is, the drain-source voltage Vd is a waveform ascending with a certain slope, but is assumed to ascend momentarily. After the gate is turned off, the FET main body current If continues to flow for a while, but is assumed to be zero immediately.

In FIG. 4A, the MOSFET is not broken. When a turn-on signal is given to gate at time T1, the drain-source voltage Vd drops nearly to 0 V, and drain current Imos flows, and this current increases according to the time constant of inductance load 29. At time T2, when the gate signal is turned off, the FET main body current If becomes 0, and the drain current Imos of MOSFET flows in the parasitic element group.

On the other hand, the drain-source voltage Vd exceeds the supply voltage E, and climbs up to breakdown voltage V0 of zener diode 24. At time T6, when the drain current Imos becomes 0, the drain-source voltage Vd becomes lower than the breakdown voltage of zener diode 24. In this case, the base-emitter voltage of transistor 25 does not reach up to the threshold voltage, but remains in off state.

At this time, supposing the drain current Imos immediately before the gate signal is turned off to be I0, and the duration from time T2 to T6 to be t0, the consumption energy MOSFET is ½ (V0×I0×t0), and this value does not lead to breakdown.

In FIG. 4B, the MOSFET for measurement is broken by energy breakdown. Operation is same as in FIG. 4A from time T1 of giving turn-on signal to the gate to right after time T2 of turning off the gate. The drain current Imos immediately before the gate signal is turned off is I0, and then the drain current Imos drops, and at time T5, the drain current Imos is I1, and the MOSFET is broken, and the MOSFET is short-circuited, and hence the drain current Imos begins to rise again. Supposing the duration from time T2 to T5 to be t1, consumption energy of MOSFET is ½ (V0×(I0+I1)×t1), and this consumption energy is breakdown limit of MOSFET. This breakdown mode is generally called energy breakdown.

In FIG. 4C, the MOSFET for measurement is broken by latch-up breakdown. Operation is same as in FIG. 4A from time T1 of giving turn-on signal to the gate to right after time T2 of turning off the gate. When the gate signal is turned off, the drain current Imos is divided into current Ic flowing in capacitor 23 and current Id flowing in zener diode 24, and this current flows in the resistor 26. When the voltage across the resistor 26 exceeds the threshold voltage, the transistor 25 is turned on, and the MOSFET for measurement is broken down. This breakdown mode is generally known as latch-up breakdown.

Figure 5:
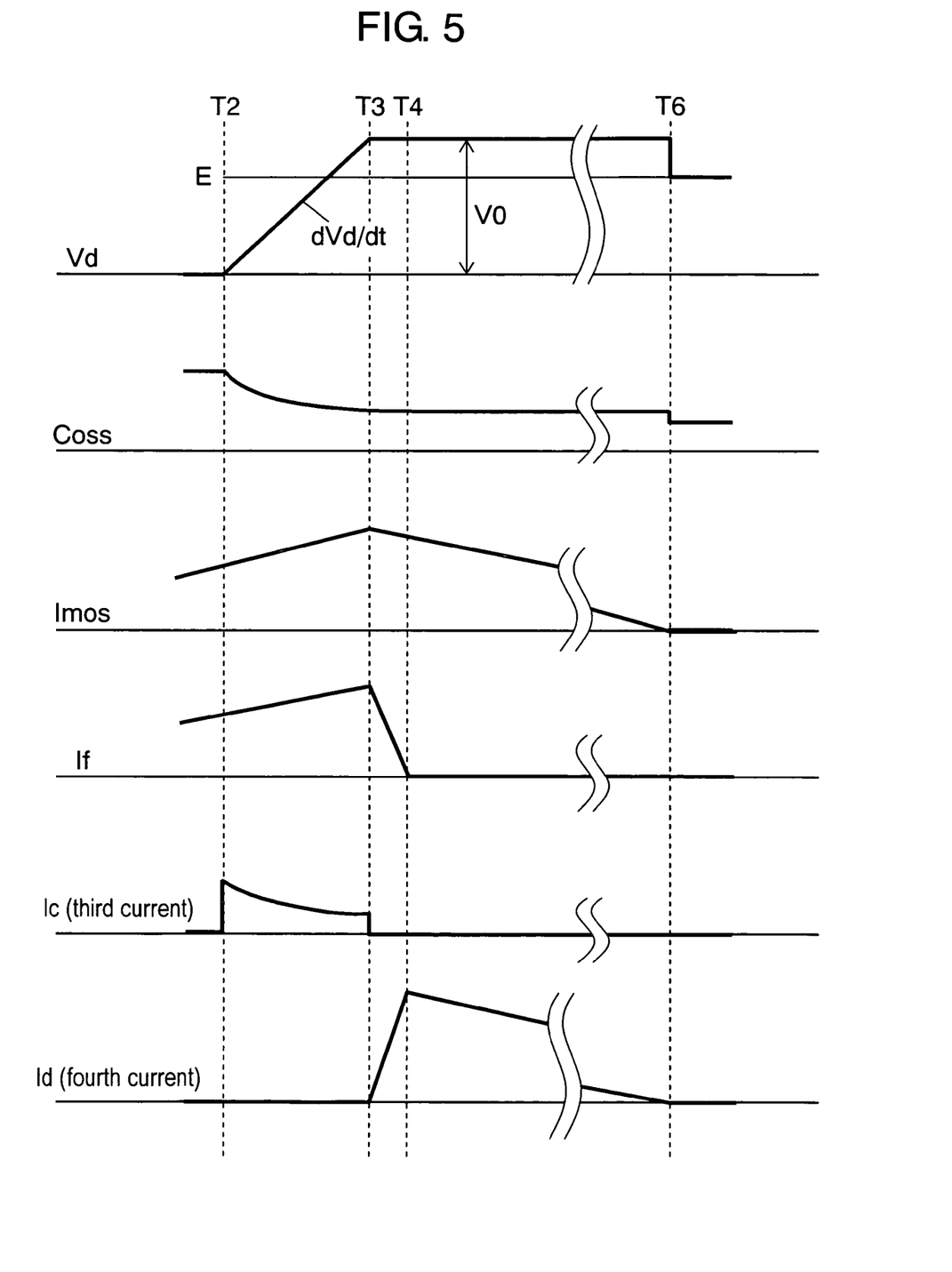
FIG. 5 is a detailed waveform diagram after turning off the gate of MOSFET of the same.
Figure 6:
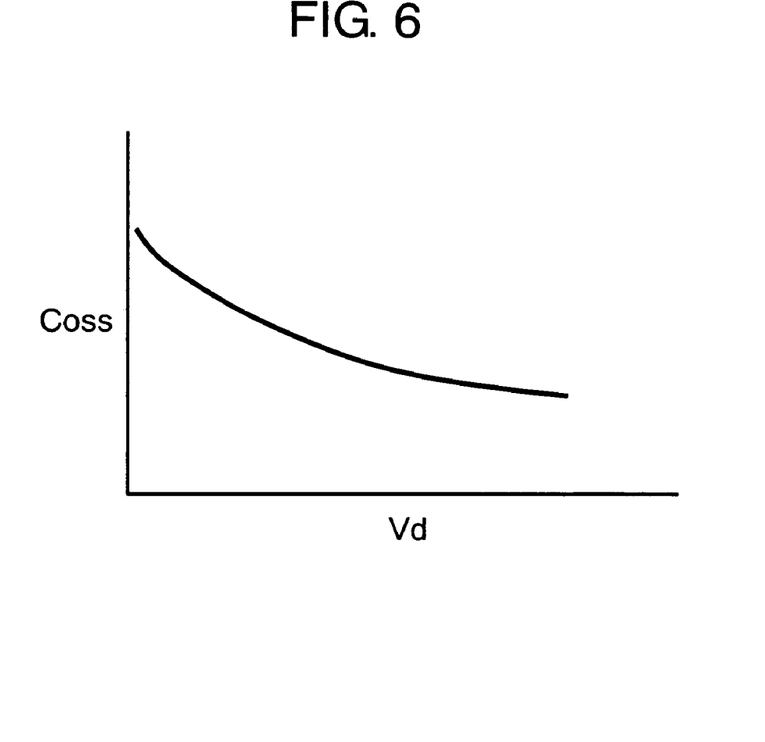
FIG. 6 is an explanatory diagram of parasitic capacity of MOSFET of the same.

FIG. 5 conceptually shows waveforms of parts after time T2 when the gate of MOSFET for measurement is turned off. As mentioned above, Vd is drain-source voltage, and Imos is drain current. Coss is capacity of capacitor 23, and as shown in FIG. 6, it depends on the drain-source voltage Vd, and the capacity is higher as Vd is smaller. If is a current flowing in the FET main body, Ic is a current flowing in the capacitor 23 (third current), and Id is a current flowing in the zener diode 24 (fourth current).

Suppose the gate of MOSFET for measurement is turned off at time T2, then at time T3, the current If flowing in the FET main body is attenuated quickly, and becomes 0 at time T4. The drain-source voltage Vd of the MOSFET elevates with a certain slope. This voltage change rate is dVd/dt. Therefore, the current Ic flowing in the capacitor 23 can be expressed in the following formula.

$$Ic = Coss \times dVd/dt$$

where the current If flowing in the FET main body includes the current Ic flowing in the capacitor.

That is, current Ic rises at time T2, and decreases depending on the capacity Coss of capacitor 23. At time T3, when drain-source voltage Vd of MOSFET reaches breakdown voltage of zener diode 24, current Id begins to flow, and current Ic becomes zero at the same time.

Generally, duration from time T2 to T4 is sufficiently longer than duration from time T4 to T6, and for the ease of understanding, in FIG. 5, change of current Imos is shown largely, but the change of Imos at time T4 may be sufficiently smaller than current Imos at time T2. That is, the current Ic flows only for a short time, and the value of current Imos at time T2 is nearly equal to the value of Id at time T4.

As a result, the sum of current Ic and current Id flows in the resistor 26, and when the voltage across the resistor 26 by this current Ir exceeds the base-emitter threshold voltage (about 0.6 V) of transistor 25, the transistor 25 is turned on, and this MOSFET for measurement is broken. Therefore, to avoid this latch-up breakdown, it is desired to decrease the resistance value of the resistor 26.

The currents flowing in the parts of the MOSFETs are explained so far, and specific operations of the preferred embodiment are described below. The preferred embodiment is intended to specify the current tolerance of MOSFET in the motor driving device shown in FIG. 1. When determining the current tolerance, what should be noticed in the first place is, as a matter of course, maximum value of current flowing when the MOSFET is turned on (first current), that is, maximum value of current flowing in the driving coil of the motor. The current tolerance must be higher than the maximum value of this first current, and it is generally determined with a proper allowance of an increment of about 30%.

In the preferred embodiment, the current tolerance of MOSFET is the sum of maximum value of first current and maximum value of current flowing in the parasitic element group upon transition when the MOSFET changes from on to off state (second current). The second current is, as clear from FIG. 3, the sum of current flowing in the capacitor (third current) and the current flowing in the zener diode (fourth current), and is equal to current Ir flowing in the resistor 26. The third current is, as mentioned above, the product of voltage change rate dVd/dt of drain-source voltage Vd of MOSFET multiplied by capacity Coss of capacitor, and it reaches the maximum value at time T2 in FIG. 5. At this time T2, it is required that latch-up breakdown should not occur.

Structurally, meanwhile, the MOSFET may be extremely small in capacity Coss of capacitor. In such a case, the current flowing in the capacitor (third current) is as small as ignorable, and the second current is equal to the third current. That is, the current flowing in the parasitic element group upon transition of MOSFET changing from on to off state entirely flows into the zener diode. In this case, too, it is required that latch-up breakdown should not occur.

Further, the current flowing in the parasitic element group upon transition of MOSFET changing from on to off state (second current) will not exceed the maximum value of current flowing in the MOSFET when the MOSFET is turned on. Therefore, the current tolerance of MOSFET is 2 times of first current.

Preferred Embodiment 2

This preferred embodiment relates to short-circuit tolerance of MOSFET. As shown in FIG. 1, in the motor driving device, since the MOSFET is connected in series to the power source, there is always a risk of flow of short-circuit current due to malfunction by noise or the like. The short-circuit current withstanding when the MOSFET is short-circuit is the short-circuit tolerance, and it depends on the duration of flow of the short-circuit current.

Figure 7:
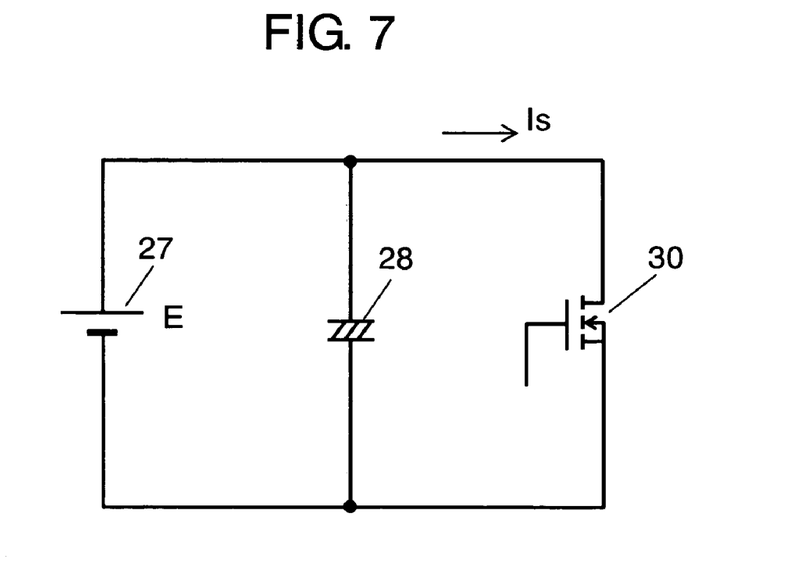
FIG. 7 is a short-circuit tolerance measuring circuit diagram of MOSFET in preferred embodiment 2 of the invention.

FIG. 7 shows a short-circuit tolerance measuring circuit of MOSFET for measurement. A capacitor 28 of large capacity is connected in parallel to a direct-current power source for measurement 27, and the power source impedance is lowered. A MOSFET for measurement 30 is connected in series to this direct-current power source. The gate of the MOSFET for measurement is connected to a gate driving circuit (not shown) capable of applying a specified voltage for a specified time.

In the circuit shown in FIG. 7, when a gate voltage is applied at specified voltage, short-circuit current Is flows in the MOSFET for measurement 30. Supposing the supply voltage to be E and the on-state resistance between drain and source of MOSFET for measurement to be Rds, the short-circuit current Is can be expressed in the following formula.

*Is=E/Rds.*

The on-state resistance between drain and source Rds depends on the gate applied voltage, and is a smaller value when the gate applied voltage is higher. Therefore, the short-circuit current Is is larger when the gate applied voltage is higher.

Supposing the flowing time of short-circuit current Is (short-circuit time) to be ts, consumption energy of MOSFET is E×Is×ts, and when this value exceeds a specified value depending on temperature, the MOSFET is broken.

The short-circuit tolerance depending on consumption energy (current tolerance in short-circuit) is specified in the condition of ts=10 ms and duty cycle of 1% or less, for instance, and it is measurable. Therefore, the MOSFETs for composing the inverter circuit of motor driving circuit can have the short-circuit tolerance when short-circuited for a specified time. This specified time is the maximum time, seeing the possibility of two MOSFETs for composing the series circuits 15, 16, 17 shown in FIG. 1 to be turned on simultaneously. Hence, by assuring the tolerance against lead-through current by simultaneous conduction of upper and lower sides by unexpected noise or surge, a motor driving device of high reliability is presented.

What is claimed is:

1. A motor driving device comprising a plurality of series circuits formed by connecting two MOSFETs in series between positive and negative terminals of a direct-current power source, with connection point of the two MOSFETs connected to a driving coil of the motor,
   wherein the MOSFET is composed of an FET main body, and a parasitic element group,
   wherein the parasitic element group is composed of:
   a transistor connected in parallel to the FET main body;
   a zener diode connected between collector and base of the transistor;
   a capacitor connected in parallel to the zener diode; and
   a resistor connected between base and emitter of the transistor, and
   wherein defining a current flowing in the FET main body when the MOSFET is turned on as a first current, and a current flowing in the parasitic element group upon transition of the MOSFET from on to off state as a second current, the MOSFET has a current tolerance in a sum of maximum value of the first current and maximum value of the second current.

2. The motor driving device of claim 1,
   wherein the second current is a sum of a third current flowing in the capacitor, and a fourth current flowing in the zener diode.

3. The motor driving device of claim 2,
   wherein the third current is a product of a voltage change rate between source and drain of the MOSFET multiplied by a capacity of the capacitor.

4. The motor driving device of claim 3,
   wherein the capacity of the capacitor is a value when a voltage between drain and source of the MOSFET is 0 V.

5. The motor driving device of claim 1,
   wherein when the second current flows in the resistor, a voltage across the resistor is smaller than a threshold voltage between base and emitter of the transistor.

6. The motor driving device of claim 2,
   wherein the third current flowing in the capacitor is substantially 0, and the second current is equal to the fourth current flowing in the zener diode.

7. The motor driving device of claim 1,
   wherein the second current is equal to the first current.

8. The motor driving device of claim 1,
   wherein a resistance value of the resistor is smaller than a quotient of a threshold voltage between base and emitter of the transistor divided by maximum value of the first current.

9. The motor driving device of claim 1,
   wherein the MOSFET further has a short-circuit tolerance when short-circuited for a specified time in the direct-current power source.

10. The motor driving device of claim 9,
    wherein the short-circuit tolerance is a quotient of a voltage of the direct-current power source divided by a on-state resistance between drain and source of the MOSFET.

11. The motor driving device of claim 9,
    wherein the specified time is a maximum time when the two MOSFETs composing the series circuit are turned on simultaneously.

12. A motor comprising a rotor, a driving coil for driving the rotor, and a MOSFET including a plurality of series circuits formed by connecting the two MOSFETs in series between positive and negative terminals of a direct-current power source, with connection point of the two MOSFETs connected to a driving coil of the motor, thereby controlling the driving coil,
    wherein the MOSFET is composed of an FET main body, and a parasitic element group,
    wherein the parasitic element group is composed of a transistor connected in parallel to the FET main body, a zener diode connected between collector and base of the transistor, a capacitor connected in parallel to the zener diode, and a resistor connected between base and emitter of the transistor, and
    wherein defining a current flowing in the FET main body when the MOSFET is turned on as a first current, and a current flowing in the parasitic element group upon transition of the MOSFET from on to off state as a second current, the MOSFET has a current tolerance in a sum of maximum value of the first current and maximum value of the second current.

13. The motor of claim 12,
    wherein the second current is a sum of a third current flowing in the capacitor, and a fourth current flowing in the zener diode.

14. The motor of claim 13,
    wherein the third current is a product of a voltage change rate between source and drain of the MOSFET multiplied by a capacity of the capacitor.

15. The motor of claim 14,
    wherein the capacity of the capacitor is a value when a voltage between drain and source of the MOSFET is 0 V.

16. The motor of claim 12,
    wherein when the second current flows in the resistor, a voltage across the resistor is smaller than a threshold voltage between base and emitter of the transistor.

17. The motor of claim 13,
    wherein the third current flowing in the capacitor is substantially 0, and the second current is equal to the fourth current flowing in the zener diode.

18. The motor of claim 12,
wherein the second current is equal to the first current.

19. The motor of claim 12,
wherein a resistance value of the resistor is smaller than a quotient of a threshold voltage between base and emitter of the transistor divided by maximum value of the first current.

20. The motor of claim 12,
wherein the MOSFET further has a short-circuit tolerance when short-circuited for a specified time in the direct-current power source.

21. The motor of claim 20,
wherein the short-circuit tolerance is a quotient of a voltage of the direct-current power source divided by a on-state resistance between drain and source of the MOSFET.

22. The motor of claim 20,
wherein the specified time is a maximum time when the two MOSFETs composing the series circuit are turned on simultaneously.

* * * * *